(12) United States Patent
Yang et al.

(10) Patent No.: US 10,707,940 B2
(45) Date of Patent: Jul. 7, 2020

(54) METHOD AND APPARATUS FOR RECEIVING SIGNAL IN INTEGER FORCING MIMO SYSTEM

(71) Applicant: POSTECH ACADEMY-INDUSTRY FOUNDATION, Pohang-si (KR)

(72) Inventors: Kyeong Cheol Yang, Pohang-si (KR); Dae Yeol Yang, Yeosu-si (KR); Sung Hye Cho, Busan (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 2 days.

(21) Appl. No.: 16/192,665

(22) Filed: Nov. 15, 2018

(65) Prior Publication Data

US 2019/0158172 A1 May 23, 2019

(30) Foreign Application Priority Data

Nov. 21, 2017 (KR) ........................ 10-2017-0155773

(51) Int. Cl.
| | | |
|---|---|---|
| *H04B 7/0452* | (2017.01) | |
| *H04B 7/06* | (2006.01) | |
| *H04B 7/08* | (2006.01) | |
| *H04B 17/336* | (2015.01) | |
| *H04B 7/0456* | (2017.01) | |
| *H04B 17/391* | (2015.01) | |
| *H04B 7/0413* | (2017.01) | |

(52) U.S. Cl.
CPC ......... *H04B 7/0663* (2013.01); *H04B 7/0413* (2013.01); *H04B 7/0473* (2013.01); *H04B 7/0842* (2013.01); *H04B 17/336* (2015.01); *H04B 17/3913* (2015.01)

(58) Field of Classification Search
CPC .............. H04B 7/0663; H04B 17/3913; H04B 7/0413; H04B 7/0842; H04B 17/336; H04B 7/0473; H04L 25/03012; H04L 25/03286; H04L 2025/03426; H04L 2025/03458
See application file for complete search history.

(56) References Cited

U.S. PATENT DOCUMENTS

2017/0311331 A1* 10/2017 Chae ................. H04L 25/03197
2018/0102818 A1*  4/2018 Chae .................... H04B 7/0452

OTHER PUBLICATIONS

Integer-Forcing MIMO Linear Receivers Based on Lattice Reduction, Amin Sakzad, Member, IEEE, J. Harshan, Member, IEEE, and Emanuele Viterbo, Fellow, IEEE , IEEE Transactions on Wireless Communications, vol. 12, No. 10, Oct. 2013; 1536-1276/13$31.00 c 2013 IEEE (Year: 2013).*

* cited by examiner

*Primary Examiner* — Edan Orgad
*Assistant Examiner* — Malick A Sohrab
(74) *Attorney, Agent, or Firm* — Morgan, Lewis & Bockius LLP

(57) ABSTRACT

In an aspect of the present invention, it is disclosed a method for receiving a signal in integer-forcing (IF) Multiple-Input Multiple-Output (MIMO) system. The method includes receiving a plurality of reception signal vectors through a plurality of channels, performing an equalization for the plurality of reception signal vectors, performing a decoding for the plurality of reception signals in which the equalization is performed using a plurality of different reversible integer matrixes, and reconstructing a transmission signal from the reception signal in which the decoding is performed.

9 Claims, 5 Drawing Sheets

Lattice reduction algorithm

Input: $\bar{F}_i = F_i \bar{A} = \left[ \bar{f}_{i,1}, \bar{f}_{i,2}, \ldots, \bar{f}_{i,M_T} \right]$     (S121)

Output: $T_i = \left[ t_{i,1}, t_{i,2}, \ldots, t_{i,M_T} \right]$     (S122)

Initialization: $T_i = I_{M_T}$     (S123)

for $j = 1$ to $M_T - 1$ for $k = j+1$ to $M_T$ $$\mu = p \cdot \text{round}\left( \frac{\langle \bar{f}_{i,j}, \bar{f}_{i,k} \rangle}{p \cdot \|\bar{f}_{i,j}\|^2} \right) \quad \text{(S124)}$$

$\bar{f}_{i,k} \leftarrow \bar{f}_{i,k} - \mu \cdot \bar{f}_{i,j}$     (S125)

$t_{i,k} \leftarrow t_{i,k} - \mu \cdot t_{i,j}$     (S126)

end end

METHOD AND APPARATUS FOR RECEIVING SIGNAL IN INTEGER FORCING MIMO SYSTEM

CROSS-REFERENCE TO RELATED APPLICATIONS

This application claims the benefit of priority of Korean Patent Application No. 10-2017-0155773 filed on Nov. 21, 2017, all of which are incorporated by reference in their entirety herein.

BACKGROUND OF THE INVENTION

Field of the Invention

The present invention relates to a method for receiving integer-forcing (IF) Multiple-Input Multiple-Output (MIMO) in a time-varying channel environment and an apparatus therefor.

This application is one of the results of the project, Development of broadcasting, communication service technologies (Project No. 2018 (2016-0-00123) (2016.04.01-2021.12.31), Project Name: Development of integer-forcing MIMO transceiver for 5G and beyond mobile communication system) hosted by Institute for Information and communications Technology Promotion (IITP) and POSTECH Research and Business Development Foundation in Republic of Korea

Related Art

Recently, an integer-forcing MIMO receiver has been getting attention as a linear receiver that attains maximum diversity in a quasi-static fading channel.

In a receiving end, after a reversible integer matrix proper for a given channel matrix is selected, equalization is performed. In addition, a combination of codewords that correspond to the corresponding reversible integer matrix is decoded. Then, a transmission message is reconstructed by multiplying an inverse matrix of the reversible integer matrix.

In the conventional method used in a block fading channel in which a channel is changed during a codeword is transmitted and received, and a plurality of channel matrixes is existed, in order to decode a fixed integer combination of codewords, a reversible integer matrix is selected. However, since the reversible integer matrix is not an optimal matrix for each channel block, there is a problem that performance degradation occurs. Accordingly, a research for a method for receiving integer-forcing is required proper for a time varying channel.

SUMMARY OF THE INVENTION

An object of an aspect of the present invention to attain the object is to provide an integer-forcing (IF) Multiple-Input Multiple-Output (MIMO) receiver and a reception method proper for a time varying channel.

In an aspect of the present invention to attain the object, a method for receiving a signal in integer-forcing (IF) Multiple-Input Multiple-Output (MIMO) system may include receiving a plurality of reception signal vectors through plurality of channels, performing an equalization for the plurality of reception signal vectors, performing a decoding for the plurality of reception signals in which the equalization is performed using a plurality of different reversible integer matrixes, and reconstructing a transmission signal from the reception signal in which the decoding is performed.

The step of performing the decoding may include selecting different reversible integer matrixes for each channel block for the plurality of reception signals in which the equalization is performed.

The step of selecting different reversible integer matrixes for each channel block may include selecting a reversible integer matrix that minimizes an arithmetic mean of an effective noise variation of an effective noise vector of the channel block.

The step of selecting different reversible integer matrixes for each channel block may include selecting the reversible integer matrix using a lattice reduction for each channel block.

The step of selecting the reversible integer matrix using a lattice reduction for each channel block may include selecting a reversible integer based matrix indicating a coefficient of an integer combination of codewords intended to be decoded for the plurality of reception signals in which the equalization is performed.

The step of selecting the reversible integer matrix using a lattice reduction for each channel block may include inputting a first matrix computed by multiplying an arbitrary value associated with eigenvalue decomposition of the reversible integer matrix and the reversible integer based matrix as an input value of a lattice reduction algorithm, selecting a second matrix corresponding to a lattice reduction operation as an output value of the lattice reduction algorithm, and determining a reversible integer matrix for each channel based on the first and second matrixes.

The step of selecting the reversible integer matrix using a lattice reduction for each channel block may include inputting a first matrix computed by multiplying an arbitrary value associated with eigenvalue decomposition of the reversible integer matrix and the reversible integer based matrix as an input value of a lattice reduction algorithm, selecting a second matrix corresponding to a lattice reduction operation as an output value of the lattice reduction algorithm, initializing the second matrix using an identity matrix, performing inner product and normalization for a plurality of different column vectors of the first matrix, finding and storing a multiple of a closest modulo value associated with the normalized column vector, performing a multiplication operation for a first column vector of the first matrix based on the stored multiple value and eliminating the same from a second column vector of the first matrix, storing the matrix in which the column elimination operation is performed as a second matrix, and determining a reversible integer matrix for each channel based on the second matrix.

The step of determining a reversible integer matrix for each channel based on the second matrix may include selecting the plurality of reversible integer matrixes satisfying $A_1 = A_2 = \ldots = A_M$ mod p (where, $A_i$ represents a reversible integer matrix, p represents a modulo value, and M represents a number of the plurality of reversible integer matrixes).

In another aspect of the present invention to attain the object, a signal receiver in an integer-forcing (IF) Multiple-Input Multiple-Output (MIMO) system may include a receiving unit for receiving a plurality of reception signal vectors through a plurality of channels, an equalizing unit for performing an equalization for the plurality of reception signal vectors, a decoding unit for performing a decoding for the plurality of reception signals in which the equalization is performed using a plurality of different reversible integer matrixes, and a signal reconstruction unit for reconstructing a transmission signal from the reception signal in which the decoding is performed.

The decoding unit may select different reversible integer matrixes for each channel block for the plurality of reception signals in which the equalization is performed.

The decoding unit may select a reversible integer matrix that minimizes an arithmetic mean of an effective noise variation of an effective noise vector of the channel block.

The decoding unit may select the reversible integer matrix using a lattice reduction for each channel block.

The decoding unit may select a reversible integer based matrix indicating a coefficient of an integer combination of codewords intended to be decoded for the plurality of reception signals in which the equalization is performed.

The decoding unit may input a first matrix computed by multiplying an arbitrary value associated with eigenvalue decomposition of the reversible integer matrix and the reversible integer based matrix as an input value of a lattice reduction algorithm, select a second matrix corresponding to a lattice reduction operation as an output value of the lattice reduction algorithm, and determine a reversible integer matrix for each channel based on the first and second matrixes.

The decoding unit may input a first matrix computed by multiplying an arbitrary value associated with eigenvalue decomposition of the reversible integer matrix and the reversible integer based matrix as an input value of a lattice reduction algorithm, select a second matrix corresponding to a lattice reduction operation as an output value of the lattice reduction algorithm, initialize the second matrix using an identity matrix, performs inner product and normalization for a plurality of different column vectors of the first matrix, find and store a multiple of a closest modulo value associated with the normalized column vector, perform a multiplication operation for a first column vector of the first matrix based on the stored multiple value and eliminating the same from a second column vector of the first matrix, store the matrix in which the column elimination operation is performed as a second matrix, and determine a reversible integer matrix for each channel based on the second matrix.

The decoding unit may select the plurality of reversible integer matrixes satisfying $A_1=A_2= \ldots =A_M$ mod p (where, $A_i$ represents a reversible integer matrix, p represents a modulo value, and M represents a number of the plurality of reversible integer matrixes).

In still another aspect of the present invention to attain the object, an integer-forcing (IF) Multiple-Input Multiple-Output (MIMO) system may include a transmitter for transmitting a plurality of transmission signals through a plurality of channels, and a receiver for receiving a plurality of reception signal vectors through the plurality of channels, performing an equalization for the plurality of reception signal vectors, performing a decoding for the plurality of reception signals in which the equalization is performed using a plurality of different reversible integer matrixes, and reconstructing a transmission signal from the reception signal in which the decoding is performed.

BRIEF DESCRIPTION OF THE DRAWINGS

FIG. 3 is a diagram illustrating a lattice reduction algorithm for each channel block which is considered in an integer-forcing Multiple-Input Multiple-Output receiver according to an embodiment of the present invention.

DESCRIPTION OF EXEMPLARY EMBODIMENTS

Figure 1:
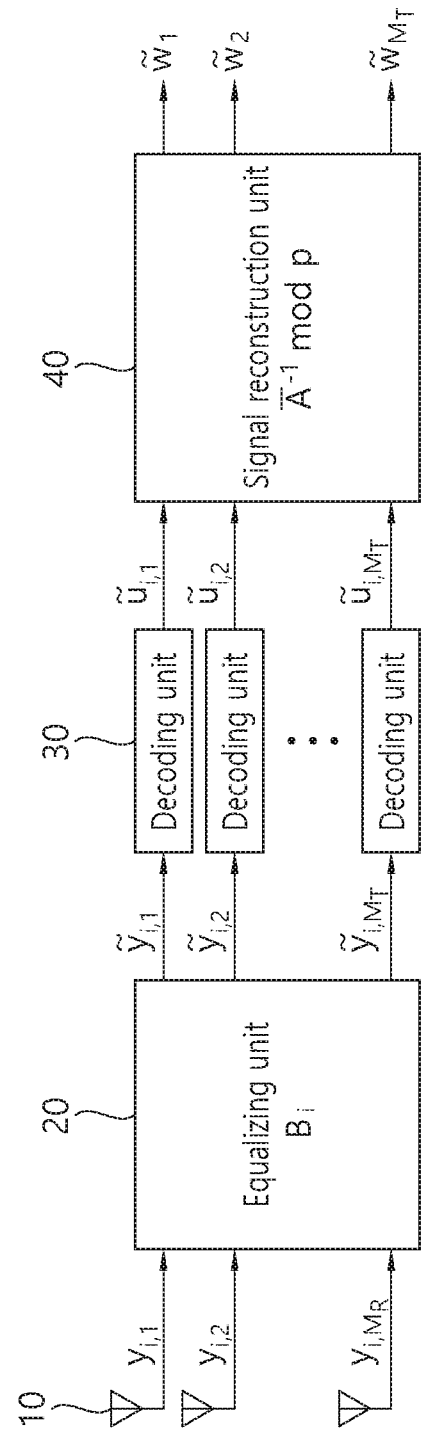
FIG. 1 is a block diagram illustrating a construction of an integer-forcing Multiple-Input Multiple-Output receiver according to an embodiment of the present invention.

The present invention allows various modifications and has many embodiments, and thus specific embodiments will be illustrated in the accompanying drawings and described.

However, it will be appreciated that the present invention is not limited to the specific embodiments, and all modifications, equivalents and substitutions may be made without departing from the concept and technical scope of the present invention.

It will be understood that, although terms first, second, etc. may be used herein to describe various elements, the elements should not be limited by the terms. The terms are only used to distinguish one element from another. For example, a first element could be termed a second element, and, similarly, a second element could be termed a first element, without departing from the scope of the present invention. As used here, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the present invention. As used herein, the singular forms are intended to include the plural forms as well, unless the context clearly indicates otherwise. It will be further understood that the terms "include" or "have" used herein, specify the presence of stated features, numbers, steps, operations, elements, components or combination thereof, but do not preclude the presence or addition of one or more other features, numbers, steps, operations, elements, components or combination thereof.

Unless otherwise defined, all terms including technical and scientific terms used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Hereinafter, preferred embodiments of the present invention will be described in detail with reference to the accompanying drawings. In describing the present invention, for the overall understanding, the same reference numeral is used for the same element in drawings, and repetitive descriptions will be avoided.

FIG. 1 is a block diagram illustrating a construction of an integer-forcing Multiple-Input Multiple-Output receiver according to an embodiment of the present invention. As shown in FIG. 1, a receiver according to an embodiment of the present invention may include a receiving unit 10, an equalizing unit 20, a decoding unit 30 and a signal reconstruction unit 40.

Referring to FIG. 1, the receiving unit 10 is implemented by a wireless antenna and/or a communication processor, and receives a signal transmitted from a transmission antenna.

According to an embodiment of the present invention, it may be considered $N_T \times N_R$ MIMO system that includes $N_T$ transmission antennas and $N_R$ reception antennas. Assuming that a channel change may be represented with M blocks during time T during which a codeword is transmitted, the input/output relation in $i(1 \leq i \leq M)^{th}$ block is as below.

$$y_{C,i} = H_{C,i} x_{C,i} + n_{C,i} \qquad \text{[Equation 1]}$$

Herein, $y_{C,i} \in C^{N_R}$ means a reception signal vector, $H_{C,i} \in C^{N_R \times N_T}$ means a channel matrix, $x_{C,i} \in C^{N_T}$ means a transmission signal vector, and $n_{C,i} \in C^{N_R}$ means a white Gaussian noise vector, and it may be assumed that the receiver knows the channel matrix accurately.

Generally, the MIMO reception signal model of Equation 1 having a complex number value may be represented as the same MIMO reception signal model having a real number value as represented in Equation 2.

$$\underbrace{\begin{bmatrix} \text{Re}(y_{C,i}) \\ \text{Im}(y_{C,i}) \end{bmatrix}}_{y_i} = \underbrace{\begin{bmatrix} \text{Re}(H_{C,i}) & -\text{Im}(H_{C,i}) \\ \text{Im}(H_{C,i}) & \text{Re}(H_{C,i}) \end{bmatrix}}_{H_i} \underbrace{\begin{bmatrix} \text{Re}(x_{C,i}) \\ \text{Im}(x_{C,i}) \end{bmatrix}}_{x_i} + \underbrace{\begin{bmatrix} \text{Re}(n_{C,i}) \\ \text{Im}(n_{C,i}) \end{bmatrix}}_{n_i} \qquad \text{[Equation 2]}$$

That is, the numbers of transmission and reception antennas in the MIMO reception signal model having a real number value becomes $M_T = 2N_T$, $M_R = 2N_R$, respectively.

The receiving unit 10 may include NR reception antennas as described above, and receive a reception signal vector $y_{i,1}$ to $y_{i,MR}$ based on it.

The equalizing unit 20 ($B_i$) is a device inserted in an amplifier or a transmission line for correcting deformation occurred during the process of amplifying or transmitting a signal and equalizing the properties by integrating them, and performs equalization for the reception signal vector $y_{i,1}$ to $y_{i,MR}$ received in the receiving unit 10. The equalizing unit 20 may include a Zero-Forcing equalizing unit, a Least Mean Squared error equalizing unit, an Automatic and Adaptive equalizing unit, and the like. But, the equalizing unit 20 may is not necessarily limited thereto.

The decoding unit 30 performs decoding for the reception signal vector in which the equalization is performed.

The signal reconstruction unit 40 ($\overline{A}^{-1}$ mod p) reconstructs a transmission message by performing linear transform for the decoded reception signal.

According to an embodiment, a situation may be considered that a channel is changed while a codeword is transmitted and received. That is, all of $H_1, H_2, \ldots, H_M$ may have different values, respectively. At this time, even in the case that the channel is changed, while a codeword is transmitted and received, an integer-forcing reception is available only when each decoding unit should decode an integer combination a fixed codeword. For this, conventionally, the same reversible integer matrix A is selected for each channel block, but in an embodiment of the present invention, different reversible integer matrix $A_i(1 \leq i \leq M)$ is selected for each channel block, and accordingly, diversity gain may be obtained.

As described above, the equalizing unit 30 may perform equalization using the following Equation for a reception signal vector $y_i$.

$$\tilde{y}_i = B_i y_i \qquad \text{[Equation 3]}$$
$$= A_i x_i + \underbrace{(B_i H_i - A_i) x_i + B_i n_i}_{z_i}$$

Herein, $A_i \in Z^{M_T \times M_T}$ is a reversible integer matrix on modulo p, $B_i \in Z^{M_T \times M_R}$ is an equalization matrix, and $z_i = (B_i H_i - A_i) x_i + B_i n_i$ is an effective noise vector.

When the reversible integer matrix $A_i$ is fixed, an optimal equalization matrix $B_i$ that minimizes variation of the effective noise vector $z_i$ is represented as Equation 4 below.

$$B_i = SNR \, A_i H_i^T (I_{M_R} + SNR \, H_i H_i^T)^{-1} \qquad \text{[Equation 4]}$$

Meanwhile, the decoding unit 30 considers the restriction condition of Equation 5 below or decoding a combination of fixed codewords on modulo p even in the case that a channel is changed.

$$A_1 = A_2 = \ldots = A_M \bmod p \qquad \text{[Equation 5]}$$

At this time, M reversible integer matrixes $A_i(1 \leq i \leq M)$ that satisfy Equation 5 above have different values with each other on integers but have the same value on modulo p, accordingly, it is available that a receiving end may decode a fixed integer combination of codewords.

That is, in the case that reversible integer matrixes $A_i(1 \leq i \leq M)$ different for each channel block are selected, variation $\sigma_{eff,i,m}^2$ of $m^{th}$ component $z_{i,m}$ of the effective noise vector $z_i$ in $i^{th}$ channel block may be arranged as Equation 6 below.

$$\sigma_{eff,i,m}^2 = SNR a_{i,m}^T (1_{M_T} + SNR H_i^T H_i)^{-1} a_{i,m} \qquad \text{[Equation 6]}$$
$$= SNR a_{i,m}^T V_i D_i^{-1} V_i^T a_{i,m}$$
$$= SNR \|F_i a_{i,m}\|^2$$

Herein, $a_{i,m}^T \in Z^{M_T}$ is the $m^{th}$ row matrix of the reversible integer matrixes $A_i(1 \leq i \leq M)$ and $F_i$ is an $M_T \times M_T$ matrix such that $(I_{M_T} + SNR \, H_i^T H_i)^{-1} = F_i^T F_i$. $I_{M_T} + SNR \, H_i^T H_i = V_i D_i V_i^T$ is a result of eigenvalue decomposition, and this is $F_i = D_i^{-1/2} V_i^T$.

That is, in order to determine M reversible integer matrixes $A_i(1 \leq i \leq M)$, as represented in Equation 7, an arithmetic mean (AM) of the effective noise variation is considered.

$$\sigma_{eff,AM,m}^2 = \frac{1}{M} \sum_{i=1}^{M} \sigma_{eff,i,m}^2 \qquad \text{[Equation 7]}$$
$$= \frac{1}{M} \sum_{i=1}^{M} (SNR \|F_i a_{i,m}\|^2)$$

In addition, through the optimization problem of Equation 8 below, M reversible integer matrixes $A_i (1 \le i \le M)$ are determined, which minimize arithmetic mean of the effective noise variation.

$$(A_1, A_2, \ldots, A_M) = \operatorname*{argmin}_{\substack{A_i \in Z^{M_T \times M_T} \\ \operatorname{rank}(A_i) = M_T \\ A_1 = A_2 = \ldots = A_M \bmod p}} \max_{1 \le m \le M_T} \sigma^2_{\mathit{eff}, AM, m} \quad \text{[Equation 8]}$$

$$= \operatorname*{argmin}_{\substack{A_i \in Z^{M_T \times M_T} \\ \operatorname{rank}(A_i) = M_T \\ A_1 = A_2 = \ldots = A_M \bmod p}} \max_{1 \le m \le M_T} \sum_{i=1}^{M} \|F_i a_{i,m}\|^2$$

The optimization problem of Equation 8 has very large search space, and accordingly, it may be difficult to perform an exhaustive search substantially. Therefore, according to an embodiment of the present invention, a method for determining M reversible integer matrixes $A_i (1 \le i \le M)$ may be considered using the lattice reduction principle. This is described in more detail with reference to FIG. 2.

Figure 2:
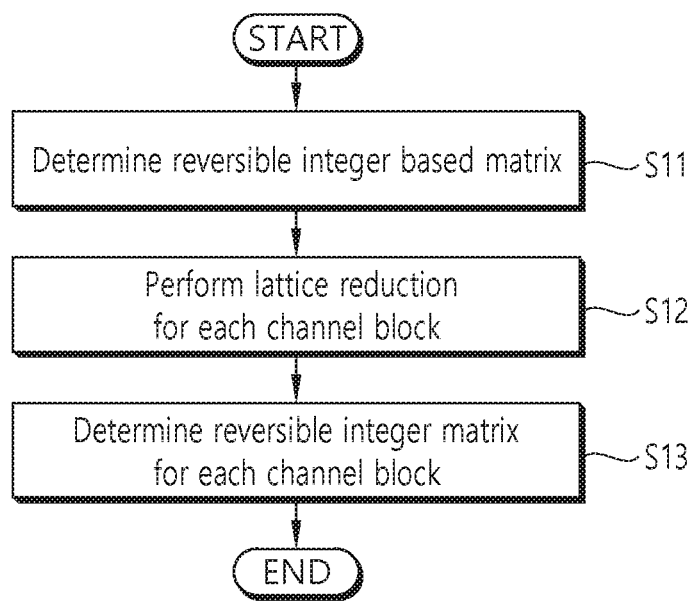
FIG. 2 is a flowchart illustrating an algorithm for determining reversible integer matrixes $A_i(1 \le i \le M)$ considered in an integer-forcing Multiple-Input Multiple-Output receiver according to an embodiment of the present invention.

FIG. 2 is a flowchart illustrating an algorithm for determining reversible integer matrixes $A_i (1 \le i \le M)$ considered in an integer-forcing Multiple-Input Multiple-Output receiver according to an embodiment of the present invention.

Referring to FIG. 2, firstly, a reversible integer based matrix $\overline{A} \in Z^{M_T \times M_T}$ is selected, which indicates a coefficient of an integer combination of a codeword which is intended to be decoded (step, S11). This may be obtained through various methods such as performing the lattice reduction algorithm for $F_{eq}$, where $F_{eq}$ is an $M_T \times M_T$ matrix such that $$F_{eq}^T F_{eq} = \frac{1}{M} \sum_{i=1}^{M} F_i^T F_i.$$

Next, a lattice reduction is performed for each channel block (step, S12). More detailed algorithm in relation to the lattice reduction is described with reference to FIG. 3.

FIG. 3 is a diagram illustrating a lattice reduction algorithm for each channel block which is considered in an integer-forcing Multiple-Input Multiple-Output receiver according to an embodiment of the present invention.

Referring to FIG. 3, an input of the algorithm is the multiplication $\overline{F}_i = F_i \overline{A}$ of matrix $F_i$ obtained in Equation 6 above and the reversible integer based matrix $\overline{A}$ (step, S121). An output of the algorithm is matrix $T_i$ that corresponds to the lattice reduction operation (step, S122). Matrix $T_i$ is initialized with an identity matrix (step, S123). After inner production and normalization are performed for different two column vectors $\overline{F}_i$, and the closest a multiple of p is found, and then, stored in μ (step, S124). μ times of $\overline{f}_{i,j}$ is eliminated to $\overline{f}_{i,k}$ (step, S125). And then, the corresponding column eliminated operation result is stored in matrix $T_i$ (step, S126).

Returning to FIG. 2 again, as such, after the lattice reduction for each channel block is performed, lastly, each of the reversible integer matrixes $A_i(1 \le i \le M)$ for each channel is determined as represented in Equation 9 below (step, S13).

$$A_i = \overline{A} T_i, 1 \le i \le M \quad \text{[Equation 9]}$$

Since $T_i(1 \le i \le M)$ obtained in FIG. 3 is an identity matrix $I_{M_T}$ on modulo p, the reversible integer matrix $A_i(1 \le i \le M)$ satisfies Equation 5 above. That is, M reversible integer matrixes $A_i(1 \le i \le M)$ have different values with each other in on integer, but have the same value on modulo p, and accordingly, it is available to decode a fixed integer combination of codewords in a receiving end.

Result of Simulation

Figure 4:
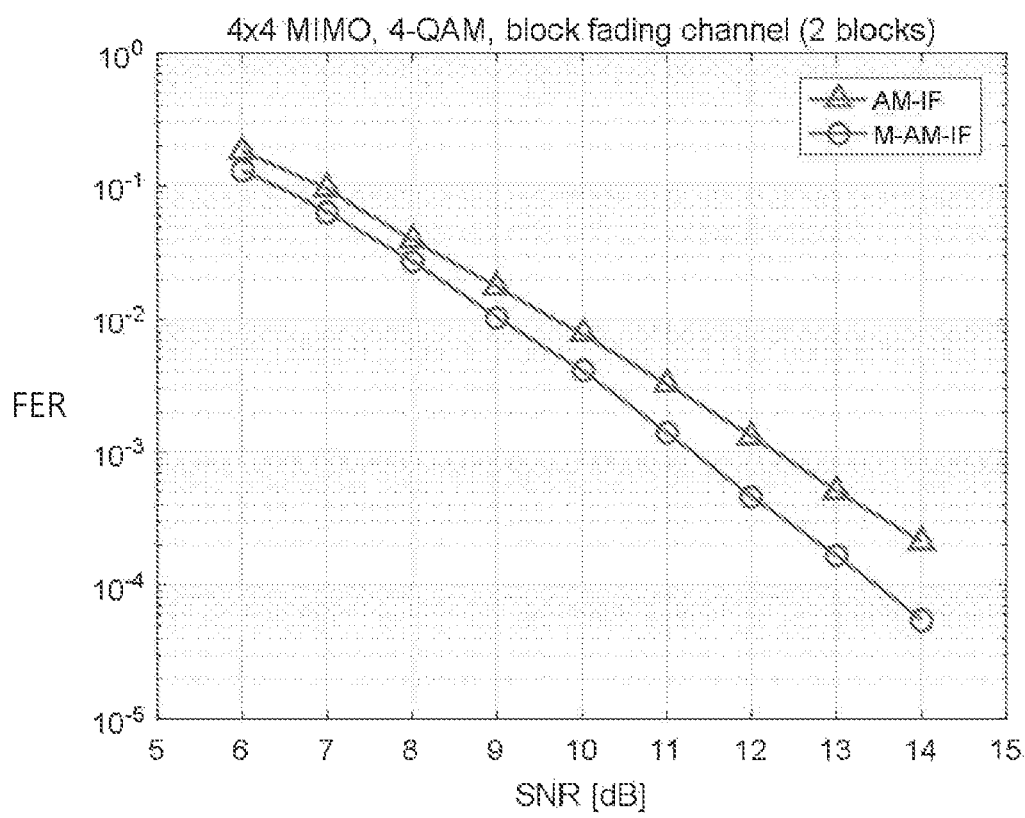
FIG. 4 is a graph showing a frame error rate performance of the conventional AM-IF reception method and the M-AM-IF reception method according to an embodiment of the present invention (M=2).
Figure 5:
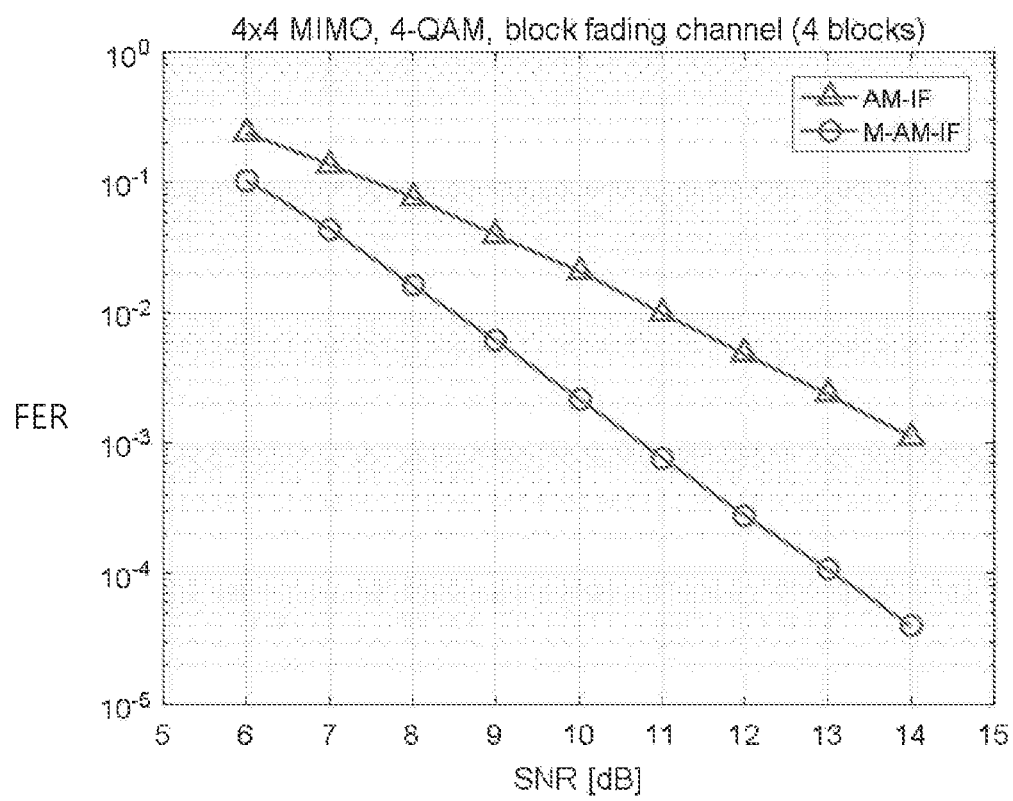
FIG. 5 is a graph showing a frame error rate performance of the conventional AM-IF reception method and the M-AM-IF reception method according to an embodiment of the present invention (M=4).

FIG. 4 is a graph showing a frame error rate (FER) performance of the conventional AM-IF reception method and the M-AM-IF reception method according to an embodiment of the present invention (M=2), and FIG. 5 is a graph showing a frame error rate (FER) performance of the conventional AM-IF reception method and the M-AM-IF reception method according to an embodiment of the present invention (M=4).

Referring to FIG. 4 and FIG. 5, when p=2, it is considered a block fading channel model in which M=2 or M=4 channel matrixes different with each other are existed during transmitting and receiving a codeword. It is known that the M-AM-IF reception method according to an embodiment of the present invention has better frame error rate performance than the conventional AM-IF reception method.

According to the integer-forcing (IF) Multiple-Input Multiple-Output (MIMO) receiver according to the present invention, the reversible integer matrix proper for each channel block can be efficiently determined, and the effective noise in each channel block is efficiently reduced in comparison with the conventional integer-forcing receiver, and accordingly, there is an effect of having good error rate performance.

So far, although drawings and exemplary embodiments have been illustrated and described, the scope of the present invention is not limited to the drawings and exemplary embodiments. It will be understood by those skilled in the art that various modifications and changes may be made in the embodiments without departing from the concept and scope of the present inventive, which are defined in the appended claims.

DESCRIPTION OF REFERENCE NUMERALS

10: Receiving unit
20: Equalizing unit
30: Decoding unit
40: Signal reconstruction unit

What is claimed is:

1. A method for receiving a signal in an integer-forcing (IF) Multiple-Input Multiple-Output (MIMO) system, comprising:
   receiving a plurality of reception signal vectors through a plurality of channels;
   performing an equalization for the plurality of reception signal vectors;
   performing a decoding for the plurality of reception signals in which the equalization is performed using a plurality of different reversible integer matrixes; and
   reconstructing a transmission signal from the reception signal in which the decoding is performed,
   wherein the step of performing the decoding includes selecting different reversible integer matrixes for each channel block for the plurality of reception signals in which the equalization is performed,
   wherein the step of selecting different reversible integer matrixes for each channel block includes selecting the reversible integer matrix using a lattice reduction for each channel block,
   wherein the step of selecting the reversible integer matrix using a lattice reduction for each channel block includes selecting a reversible integer based matrix indicating a coefficient of an integer combination of codewords intended to be decoded for the plurality of reception signals in which the equalization is performed, and wherein the step of selecting the reversible integer matrix using a lattice reduction for each channel block includes inputting a first matrix computed by multiplying an arbitrary value associated with eigenvalue decomposition of the reversible integer matrix and the reversible integer based matrix as an input value of a lattice reduction algorithm, selecting a second matrix corresponding to a lattice reduction operation as an output value of the lattice reduction algorithm, and determining a reversible integer matrix for each channel based on the first and second matrixes.

2. The method for receiving a signal in an IF MIMO system of claim 1, wherein the step of selecting different reversible integer matrixes for each channel block includes:

selecting a reversible integer matrix that minimizes an arithmetic mean of an effective noise variation of an effective noise vector of the channel block.

3. The method for receiving a signal in an IF MIMO system of claim 1, wherein the step of selecting the reversible integer matrix using a lattice reduction for each channel block includes:

inputting a first matrix computed by multiplying an arbitrary value associated with eigenvalue decomposition of the reversible integer matrix and the reversible integer based matrix as an input value of a lattice reduction algorithm;

selecting a second matrix corresponding to a lattice reduction operation as an output value of the lattice reduction algorithm;

initializing the second matrix using an identity matrix;

performing inner product and normalization for a plurality of different column vectors of the first matrix;

finding and storing a multiple of a closest modulo value associated with the normalized column vector;

performing a multiplication operation for a first column vector of the first matrix based on the stored multiple value and eliminating the same from a second column vector of the first matrix;

storing the matrix in which the column elimination operation is performed as a second matrix; and determining a reversible integer matrix for each channel based on the second matrix.

4. The method for receiving a signal in an IF MIMO system of claim 3, wherein the step of determining a reversible integer matrix for each channel based on the second matrix includes:

selecting the plurality of reversible integer matrixes satisfying $A_1 = A_2 = \ldots = A_M$ mod p (where, $A_1$ represents a reversible integer matrix, p represents a modulo value, and M represents a number of the plurality of reversible integer matrixes).

5. A signal receiver in an integer-forcing (IF) Multiple-Input Multiple-Output (MIMO) system, comprising:

a receiving unit for receiving a plurality of reception signal vectors through a plurality of channels;

an equalizing unit for performing an equalization for the plurality of reception signal vectors;

a decoding unit for performing a decoding for the plurality of reception signals in which the equalization is performed using a plurality of different reversible integer matrixes; and a signal reconstruction unit for reconstructing a transmission signal from the reception signal in which the decoding is performed, wherein the decoding unit is configured to select different reversible integer matrixes for each channel block for the plurality of reception signals in which the equalization is performed, wherein the decoding unit is configured to select the reversible integer matrix using a lattice reduction for each channel block, wherein the decoding unit is configured to select a reversible integer based matrix indicating a coefficient of an integer combination of codewords intended to be decoded for the plurality of reception signals in which the equalization is performed, and wherein the decoding unit is configured to input a first matrix computed by multiplying an arbitrary value associated with eigenvalue decomposition of the reversible integer matrix and the reversible integer based matrix as an input value of a lattice reduction algorithm, select a second matrix corresponding to a lattice reduction operation as an output value of the lattice reduction algorithm, and determine a reversible integer matrix for each channel based on the first and second matrixes.

6. The signal receiver in an IF MIMO system of claim 5, wherein the decoding unit is configured to select a reversible integer matrix that minimizes an arithmetic mean of an effective noise variation of an effective noise vector of the channel block.

7. The signal receiver in an IF MIMO system of claim 5, wherein the decoding unit is configured to input a first matrix computed by multiplying an arbitrary value associated with eigenvalue decomposition of the reversible integer matrix and the reversible integer based matrix as an input value of a lattice reduction algorithm, select a second matrix corresponding to a lattice reduction operation as an output value of the lattice reduction algorithm, initialize the second matrix using an identity matrix, perform inner product and normalization for a plurality of different column vectors of the first matrix, find and store a multiple of a closest modulo value associated with the normalized column vector, perform a multiplication operation for a first column vector of the first matrix based on the stored multiple value and eliminating the same from a second column vector of the first matrix, store the matrix in which the column elimination operation is performed as a second matrix, and determine a reversible integer matrix for each channel based on the second matrix.

8. The signal receiver in an IF MIMO system of claim 7, wherein the decoding unit is configured to select the plurality of reversible integer matrixes satisfying $A_1 = A_2 = \ldots = A_M$ mod p (where, $A_i$ represents a reversible integer matrix, p represents a modulo value, and M represents a number of the plurality of reversible integer matrixes).

9. An integer-forcing (IF) Multiple-Input Multiple-Output (MIMO) system, comprising:

a transmitter for transmitting a plurality of transmission signals through a plurality of channels; and a receiver for receiving a plurality of reception signal vectors through the plurality of channels, performing an equalization for the plurality of reception signal vectors, performing a decoding for the plurality of reception signals in which the equalization is performed using a plurality of different reversible integer matrixes, and reconstructing a transmission signal from the reception signal in which the decoding is performed, wherein the receiver for performing the decoding is configured to select different reversible integer matrixes for each channel block for the plurality of reception signals in which the equalization is performed, wherein the receiver configured to select different reversible integer matrixes for each channel block is configured to select the reversible integer matrix using a lattice reduction for each channel block, wherein the receiver configured to select the reversible integer matrix using a lattice reduction for each channel block is configured to select a reversible integer based matrix indicating a coefficient of an integer combination of codewords intended to be decoded for the plurality of reception signals in which the equalization is performed, and wherein the receiver configured to select the reversible integer matrix using a lattice reduction for each channel block is configured to input a first matrix computed by multiplying an arbitrary value associated with eigenvalue decomposition of the reversible integer matrix and the reversible integer based matrix as an input value of a lattice reduction algorithm, select a second matrix corresponding to a lattice reduction operation as an output value of the lattice reduction algorithm, and determine a reversible integer matrix for each channel based on the first and second matrixes.

* * * * *